Figure 1:
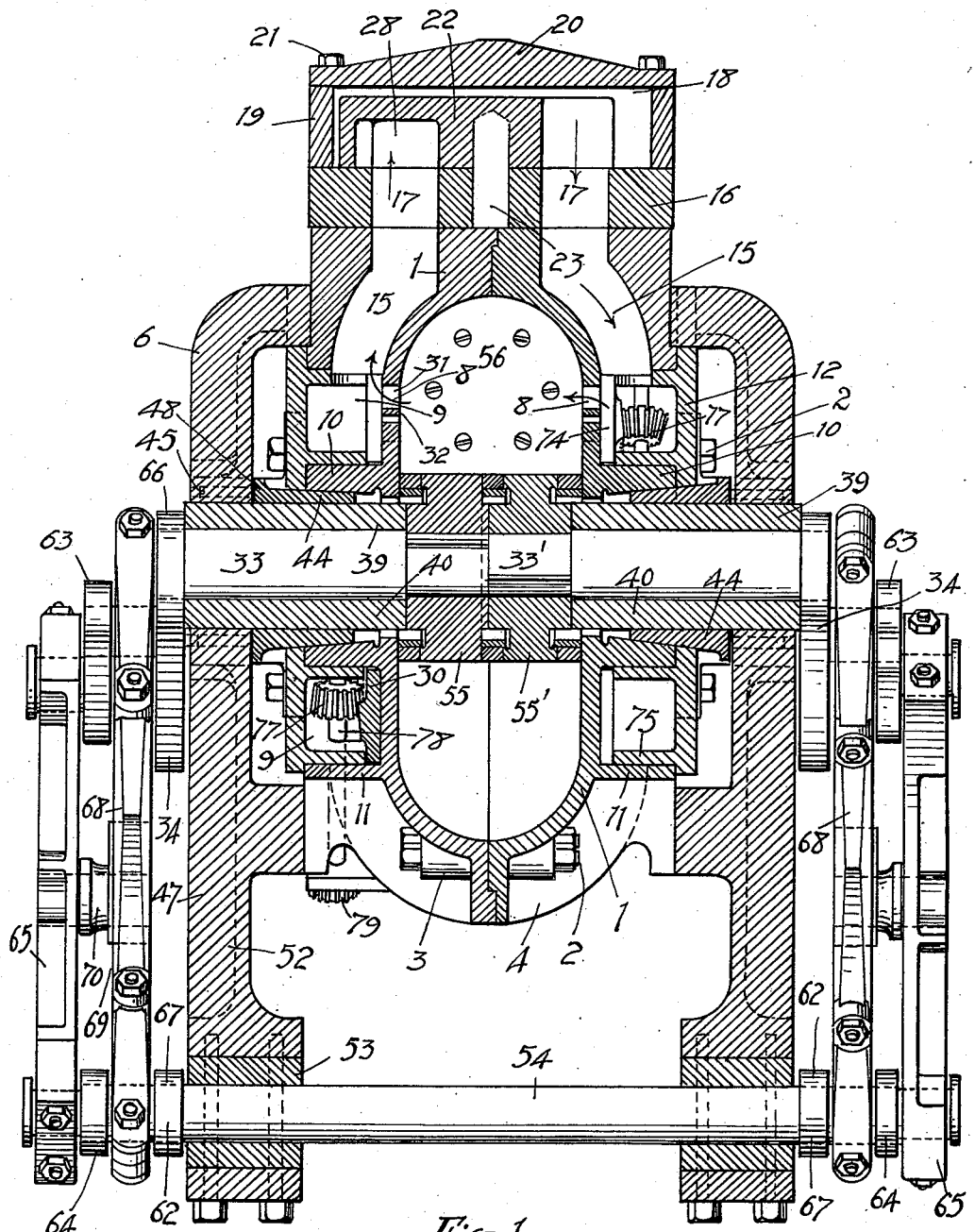

J. T. AABEL.
ROTARY ENGINE.
APPLICATION FILED SEPT. 30, 1907. RENEWED OCT. 20, 1910.

1,028,848.

Patented June 11, 1912.

8 SHEETS—SHEET 1.

WITNESSES:

INVENTOR,

BY

ATTORNEY.

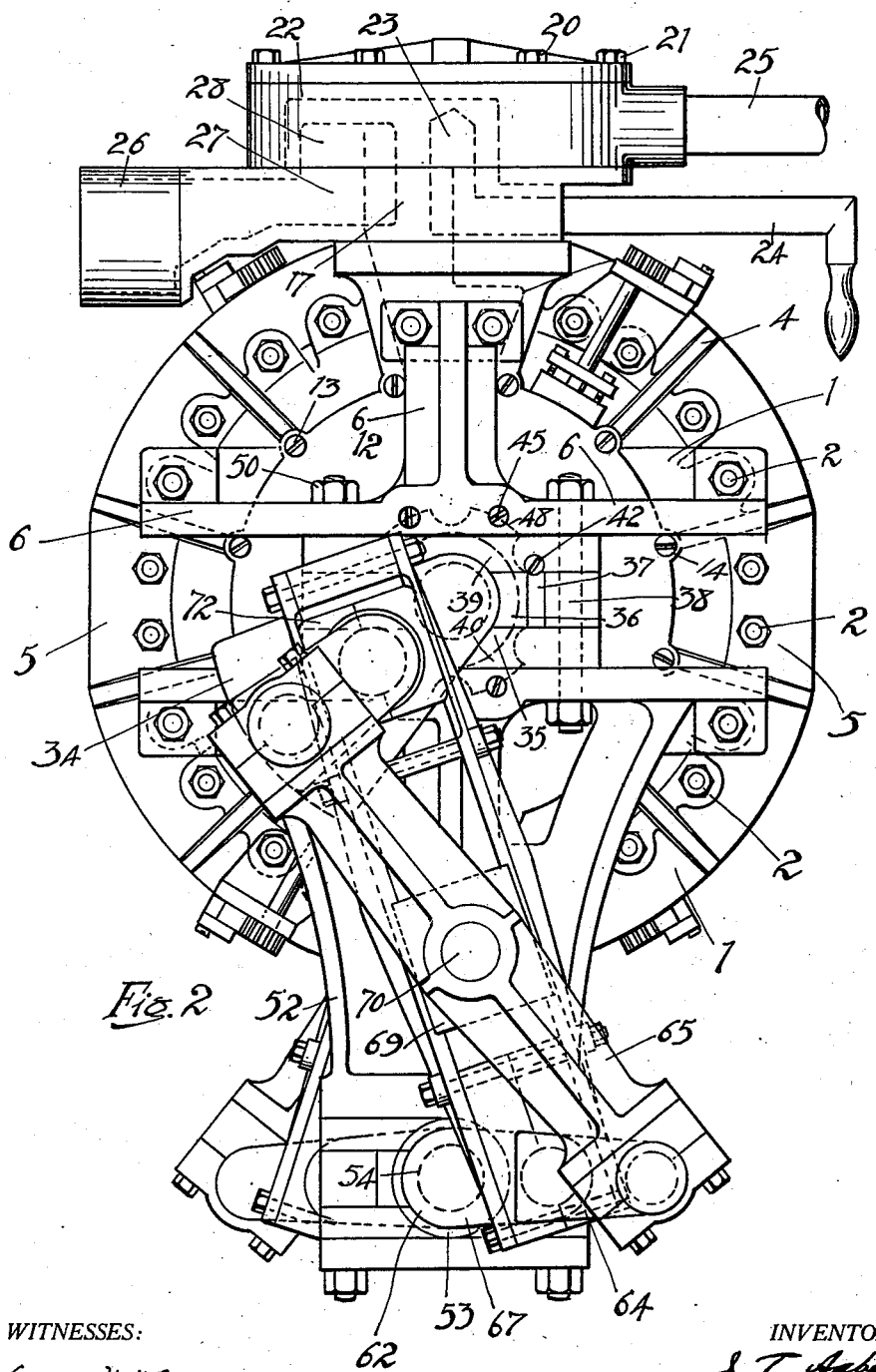

J. T. AABEL.
ROTARY ENGINE.
APPLICATION FILED SEPT. 30, 1907. RENEWED OCT. 20, 1910.
1,028,848.
Patented June 11, 1912.
8 SHEETS—SHEET 3.
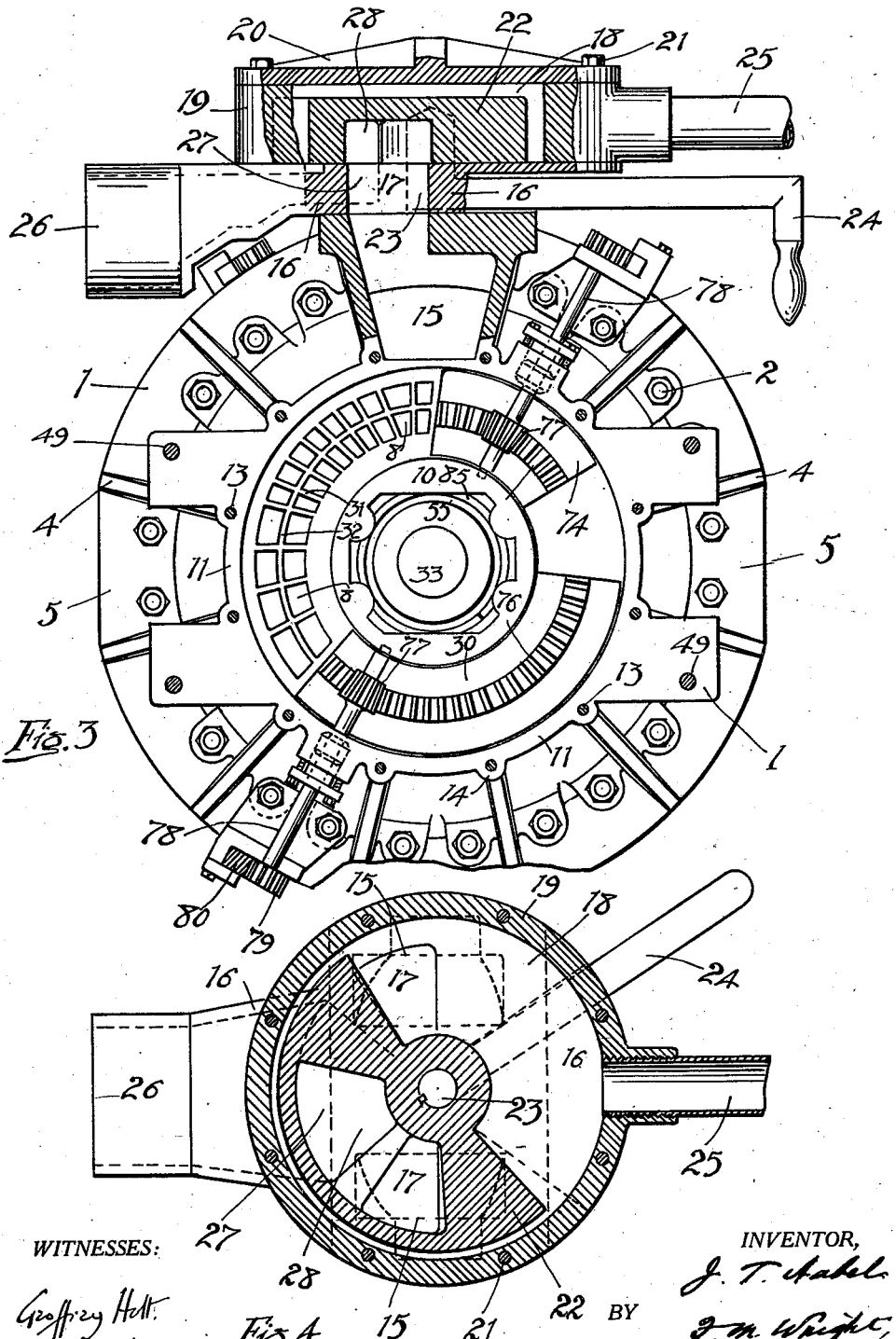
WITNESSES:
INVENTOR,
J. T. Aabel
BY
ATTORNEY.

J. T. AABEL.
ROTARY ENGINE.
APPLICATION FILED SEPT. 30, 1907. RENEWED OCT. 20, 1910.

1,028,848.

Patented June 11, 1912.

8 SHEETS—SHEET 4.

WITNESSES:
Geoffrey Holt.
M. Eastman

INVENTOR,
J. T. Aabel,
BY
G. M. Wright
ATTORNEY.

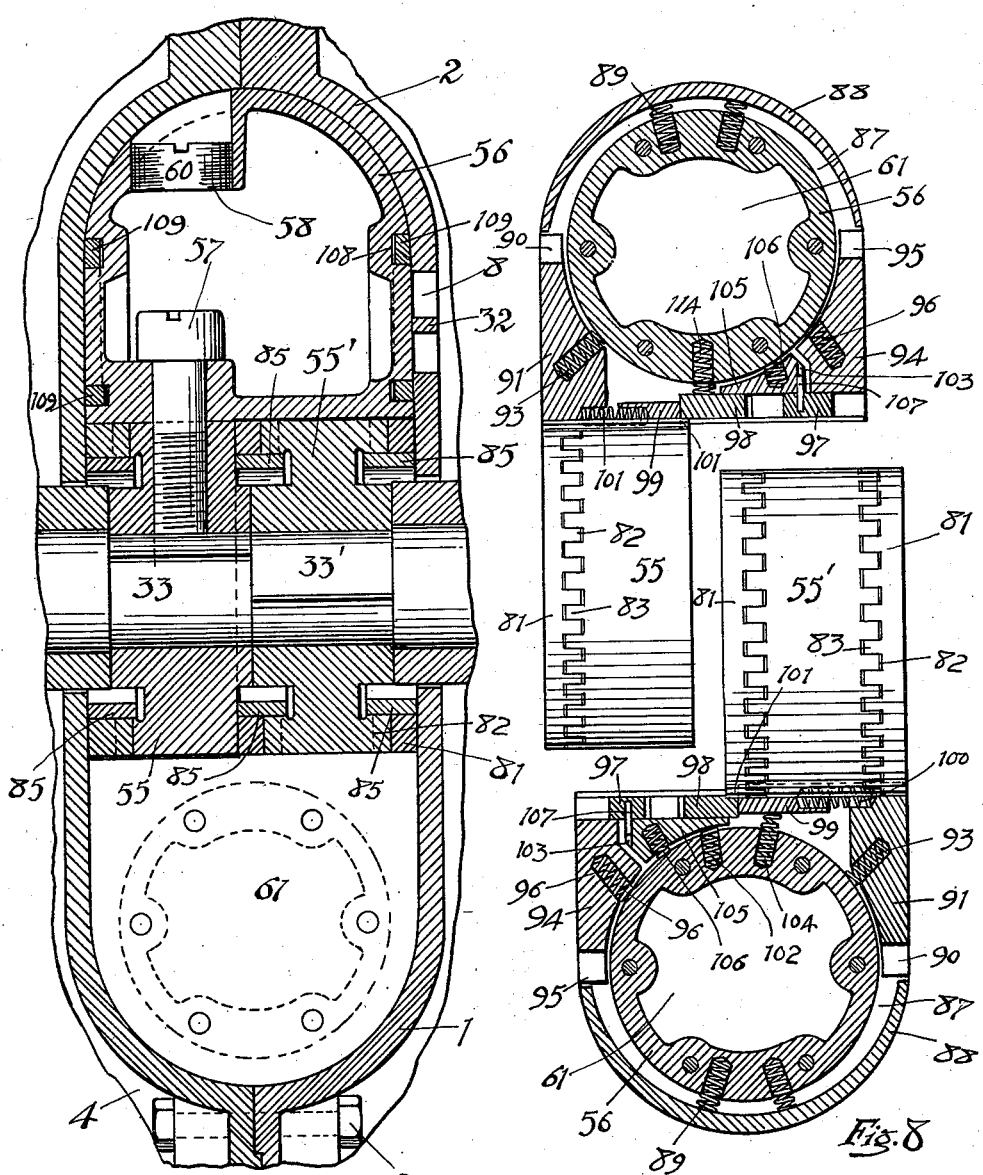

J. T. AABEL.
ROTARY ENGINE.
APPLICATION FILED SEPT. 30, 1907. RENEWED OCT. 20, 1910.
1,028,848.
Patented June 11, 1912.
8 SHEETS—SHEET 6.
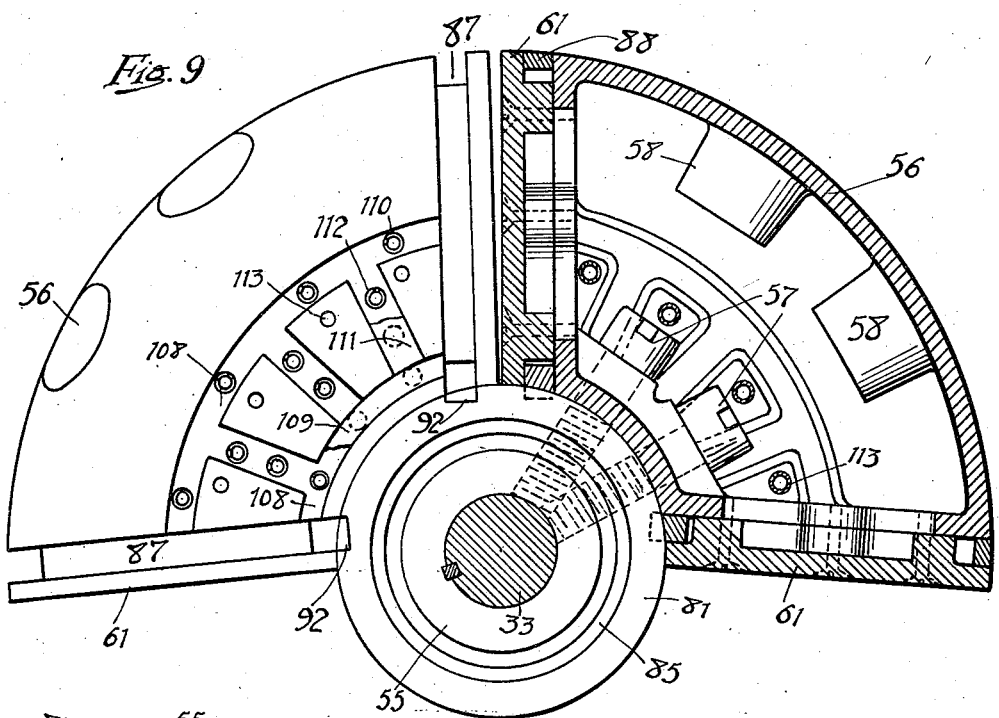
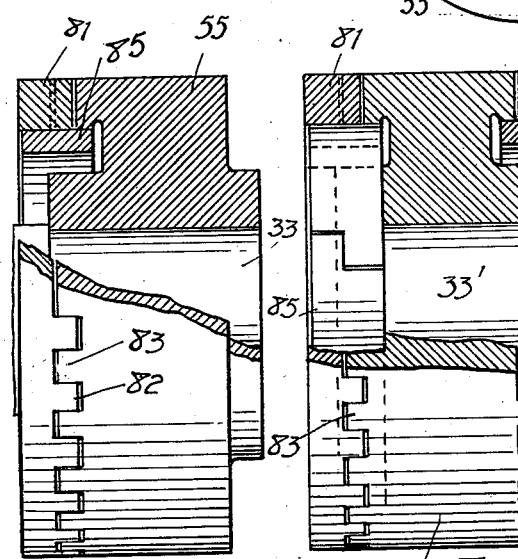
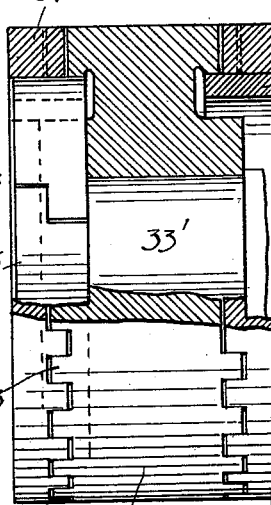
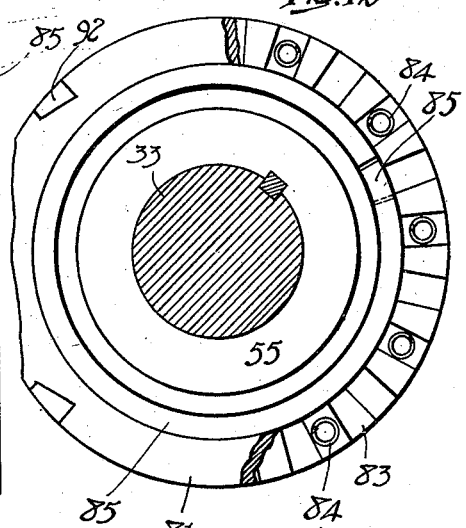
WITNESSES:
INVENTOR,
BY
ATTORNEY.

J. T. AABEL.
ROTARY ENGINE.
APPLICATION FILED SEPT. 30, 1907. RENEWED OCT. 20, 1910.
1,028,848.
Patented June 11, 1912.
8 SHEETS—SHEET 7.
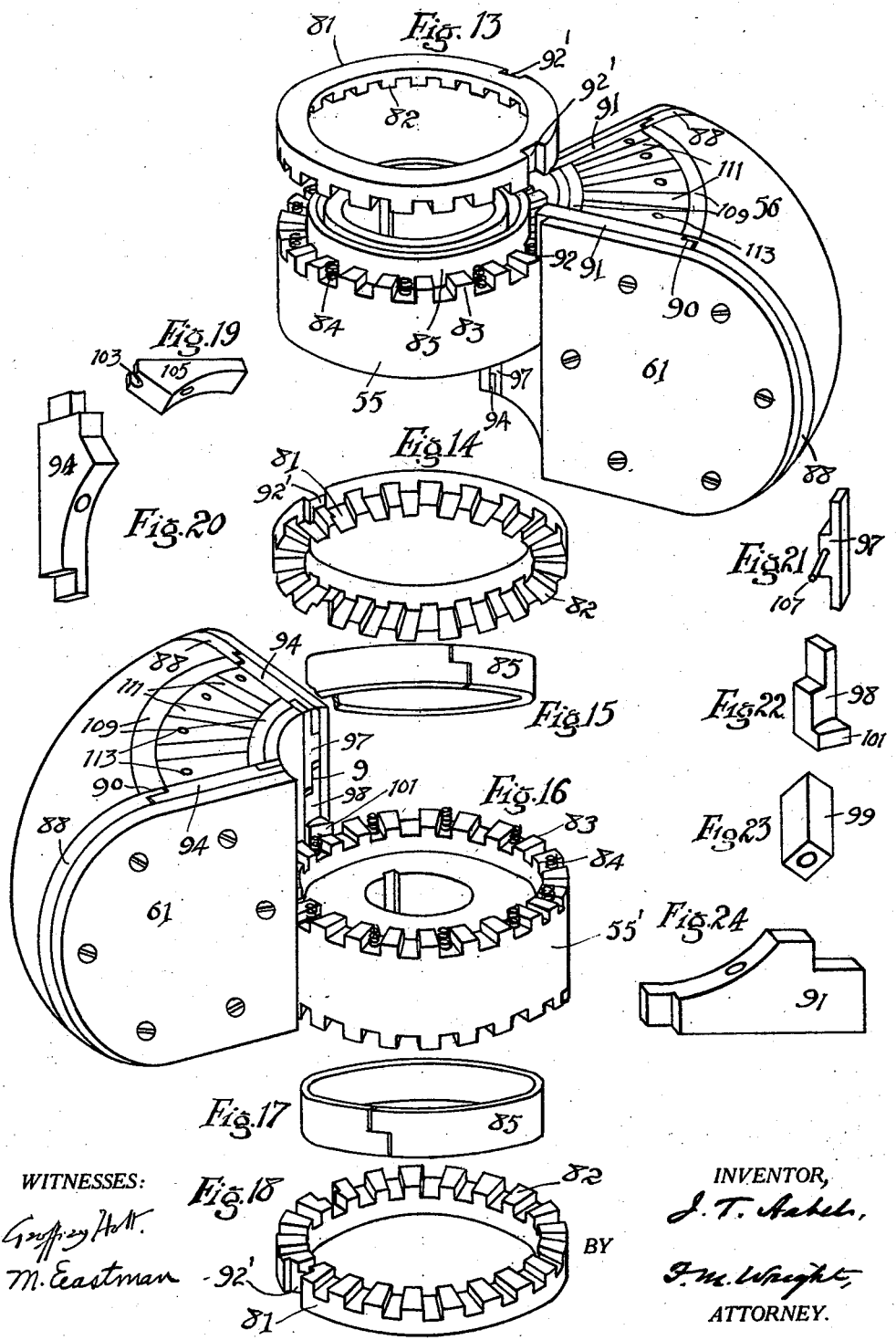
WITNESSES:
INVENTOR,
J. T. Aabel,
BY
F. M. Wright,
ATTORNEY.

J. T. AABEL.
ROTARY ENGINE.
APPLICATION FILED SEPT. 30, 1907. RENEWED OCT. 20, 1910.

1,028,848.

Patented June 11, 1912.

8 SHEETS—SHEET 8.

WITNESSES:
Geoffrey Holt.
M. Eastman

INVENTOR,
J. T. Aabel,
BY
J. M. Wright,
ATTORNEY.

UNITED STATES PATENT OFFICE.

JOHN T. AABEL, OF SAN FRANCISCO, CALIFORNIA, ASSIGNOR TO MONARCH ROTARY ENGINE COMPANY, OF SAN FRANCISCO, CALIFORNIA, A CORPORATION OF CALIFORNIA.

ROTARY ENGINE.

1,028,848.     Specification of Letters Patent.     Patented June 11, 1912.

Application filed September 30, 1907, Serial No. 395,057. Renewed October 20, 1910. Serial No. 588,182.

*To all whom it may concern:*

Be it known that I, JOHN T. AABEL, a citizen of the United States, residing at San Francisco, in the county of San Francisco and State of California, have invented new and useful Improvements in Rotary Engines, of which the following is a specification.

The object of the present invention is to provide a rotary engine, adapted to be driven by steam or other pressure fluid, which, in addition to avoiding the necessity of converting a reciprocating into a rotary movement, shall also possess the following advantages:—First; in which the live steam, instead of exerting a back pressure upon a non-rotating device, such as a gate or other part corresponding to the cylinder head of a reciprocating engine, is carried forward with pistons in their movement, the advantage obtained thereby being that the part of the cylinder where the steam enters is maintained as nearly as possible at a uniform temperature, so that substantially no heat is lost by initial condensation, which is a source of very considerable loss in steam engines, both reciprocating and rotary, as heretofore constructed. Second; in which there shall be no valves operated by the movement of the engine, the pistons themselves alternately acting as valves to control the passage of the steam to and fro from the cylinder. Third; in which the parts will be so packed as to effectively prevent the leakage of live steam. Fourth; in which the cut off can be regulated to suit the varying conditions of the load. Fifth; in which the mechanism for reversing the engine shall be simple in construction and easily operated, and in which the engine will run with the same power and efficiency in both directions. Sixth; in which the connections of the piston shafts to the main shaft may also be utilized for regulating the movements of the pistons so that they may have the requisite alternately fast and slow motions. Seventh; in which these parts will be so arranged that the injurious effect of lost motion due to wear shall be minimized. Eighth; in which the bearings for the piston shaft, instead of forming part of the cylinder casing, as has heretofore been the general construction, are supported by separate casings, so that said bearings, not being in the same piece with the cylinder casing, do not become overheated by conduction of heat.

My invention also resides in the novel construction, combination, and arrangement of parts for the above ends, hereinafter fully specified and particularly pointed out in the claims.

Figure 5:
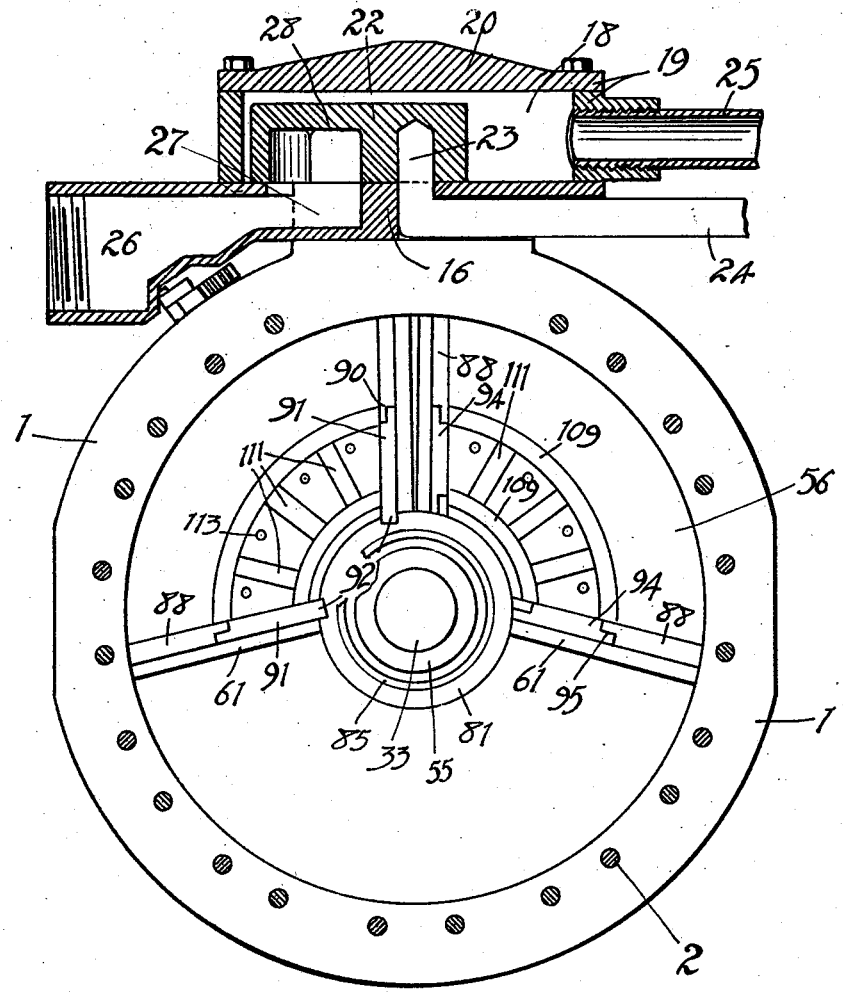
Figure 6:
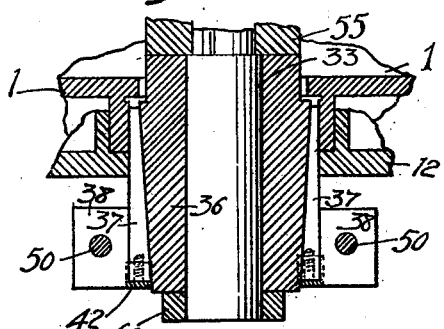
Figure 25:
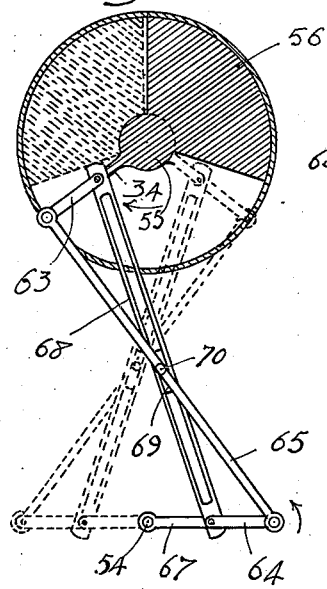
Figure 26:
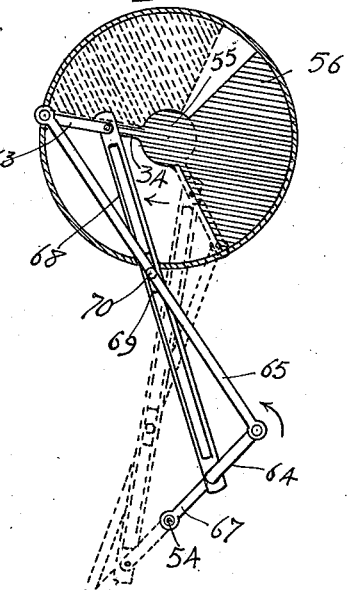

In the accompanying drawings, Figure 1 is a longitudinal central section of the engine, the shafts and cranks being shown in side elevation; Fig. 2 is an end view thereof; Fig. 3 is a broken end view, certain parts being removed, and other parts shown in section; Fig. 4 is a horizontal section through the reversing valve chamber; Fig. 5 is a side view, one section of the cylinder being removed, and the reversing valve chamber being shown in section; Fig. 6 is a detail horizontal section of a bearing for one of the cylinder shafts; Fig. 7 is an axial section through the cylinder; Fig. 8 is a sectional view of the pistons separated, the hubs being shown in elevation; Fig. 9 is a detail side view, partly in section, of the two pistons, certain parts being removed; Fig. 10 is a broken side elevation of one of the hubs; Fig. 11 is a similar view of the other hub; Fig. 12 is a broken end view of one of the hubs; Fig. 13 is a perspective view of one of the pistons and its corresponding hub, the packing ring being detached; Fig. 14 is a perspective view of the packing ring of the other piston; Fig. 15 is a similar view of a snap ring thereof; Fig. 16 is a similar view of the other piston with its hub; Fig. 17 is a similar view of the other snap ring thereof; Fig. 18 is a similar view of the other packing ring thereof; Figs. 19 to 24 are detail perspective views of various packing pieces; Figs. 25 to 30 are diagrammatic views of the engine at various positions of the pistons.

Referring to the drawings, 1 indicates the two cylinder casing sections, bolted together by bolts 2 through suitable bosses 3 formed on said sections. Said casing sections are strengthened at suitable intervals by means of radial ribs 4, and also at suitable points with strengthening blocks or lugs 5, for attachment by similar bolts to the T-shaped hanger bars 6, by means of which the cylinder may be conveniently supported or suspended, as may be desired, the sections being also bolted, as shown in Fig. 1, to the central members of said hanger bars.

When using two cylinders to form either a double or a compound engine, these hanger bars serve to connect the two cylinders. However, since these two cylinders are identical in construction, only one is here shown. The sides of the cylinder thus formed are flat at the center, while its periphery is semi-circular in cross section. The flat sides are formed with a series of ports 8, (Figs. 1, 3, 5) which on one side form the steam ports and on the other side the exhaust ports, being for these purposes used interchangeably on the two sides, depending upon the side at which the steam is admitted and on the direction in which it is desired to rotate the engine. For simplicity, the ports on the right in Fig. 1 will be considered as those used for steam ports, it being understood that the construction is the same on both sides of the cylinder and that the ports on either side may be used either as steam or as exhaust ports. On the outside of the cylinder the ports 8 at each side connect with an annular steam or exhaust chamber 9, (Fig. 1) which surrounds a hub-like projection 10 from the side of the cylinder casing section, and is inclosed by a circular wall 11, (Figs. 1, 3,) extending from the side of the casing section at right angles thereto. The chamber 9 is then closed by a circular cover plate 12 secured to the casing section by screws 13 through ears 14 at its outer edge, and at its inner edge to the hub-like projection 10. By this means there is formed an annular steam chamber adjacent to the side of the casing section. Steam is admitted to the chamber 9 or the exhaust is taken therefrom by means of a conduit 15 formed in the casing section, which latter is enlarged or thickened in the space that would intervene between the uppermost two ribs 4, to form a wall for said conduit, (Figs. 1, 2, 3.)

At the top of the cylinder is secured a casting 16, through which are formed passages 17, one on each side of the cylinder, forming extensions of the conduits 15, and selectively leading from the reversing valve chamber, 18 (Fig. 1) which is formed in the reversing valve casting 19, closed at the top by a cover 20, said cover 20 and castings 19 and 16 being secured to the body of the cylinder by screws 21. In said reversing valve chamber can oscillate the reversing valve 22 which is secured to a stem 23 extending downward through a bearing in the casting 16 (Figs. 1, 2, 3, 4) and having at its lower end a lever 24 which can oscillate in a fan shaped opening (Fig. 4) formed in said casting 16 and can be moved in said opening to reverse the direction of the steam. The steam enters into the reversing valve chamber by a steam pipe 25, and the exhaust outlet 26 is formed in the casting 16. Said outlet is always in communication by an opening 27 with a conduit 28 formed in the underside of the oscillating reversing valve 22. Said valve is more clearly shown in Fig. 4, in which figure is also shown the opening 27 to exhaust, and also the two passages 17 to the conduits 15 which lead to the opposite sides of the cylinder. When the valve is moved to one of its limiting positions, one of these openings 17 is in communication with the conduit 28 formed on the under side of the valve 22, and is therefore connected with the exhaust, but the other opening 17 is then uncovered by the oscillating valve 22, and is therefore open to the interior of the reversing chamber 18, so as to admit the live steam therefrom. By the shifting of the reversing valve to its other limiting position, the latter opening is connected with exhaust and the former with the live steam.

The passage of steam from the steam chamber 9 to the cylinder through the ports 8 is controlled by means of a valve 30, the valve 30 on the other side of the cylinder being then moved entirely from off the ports on that side to allow of the exhaust steam escaping freely into the conduit 15 on that side and so to exhaust. These ports 8 in the side of the cylinder are formed in two circular series divided by radial ribs 31, the two series being also separated by a circular rib 32, (Fig. 3). The reason for this construction will be more fully explained after a description has been given of the movements of the two pistons in the cylinder.

There are provided two piston shafts 33, 33', which, as clearly shown in Fig. 1, abut against each other at their inner ends. Each shaft at its outer end, outside the cylinder, has a double throw crank 34, (Figs. 1, 2,). The bearing for each shaft is of common construction, and is not claimed herein. It comprises two quarter-boxes 36, (Figs. 1, 6,) which are concave on their inner sides, and fit against the shaft, two horizontal wedges 37 which bear against the outer sides of the quarter-boxes, and two stationary blocks 38. All of these parts are of the same height, and are contained between two plates 39, 40, which form the upper and lower portions of the bearing, being concave as shown at 41 to fit against the shaft. The wedges 37 are moved inwardly, to take up the wear, by means of screws 42 which are screwed into the upper plate 39 and the heads of these screws bear against the outer ends of the wedges and thus force them inwardly as the screws are screwed into the plate, (Figs. 2, 6). The upper and lower plates 39, 40, are moved inwardly toward the shaft to take up the wear by means of wedges 44 which extend between said plates and the inner wall of the hub shaped projection 10 from the side of the casing section. Said wedges are moved inwardly, to force the plates inward toward the shaft, by means of screws 45 which are screwed through the horizontal members of the hanger bars 6, their inward ends abutting against ears 48 formed upon the wedges, (Figs. 1, 2.) Bolts 50 pass the hanger bars 6 through and through the blocks 38 and the ends of the plates 39, 40, thereby firmly securing the latter parts in place. The central member of the former hanger bar 6 is extended, as shown at 52 to support the bearing 53 for the main shaft 54. The construction of this bearing is similar to those of the piston shafts except that the wedges 44 are now omitted.

To the shafts 33, 33', within the cylinder are secured by keys the respective hubs 55, 55', extending entirely around the shaft, these hubs moving side by side, and upon each hub is secured a piston 56 in form a sector of a hollow annulus. Each piston is secured to the hub by means of two screws 57. (Fig. 9), the head of each screw being in the interior of the hollow piston, therefore access is obtained to said head to turn the same through an aperture formed in an inwardly extending boss 58, in the outer side of the piston, which apertures are afterward closed by means of screw plugs 60. While each hub is of less width than one-half the interior width of the cylinder the piston secured thereon is of substantially of the same width as said interior of the cylinder and thus fills up the space between the two casing sections the two pistons being secured to their respective hubs so as to follow one behind the other. Plates 61 close the ends of the pistons which are circular in cross section as shown in Fig. 8 being cut down to provide room of packing pieces to pack the ends of the pistons. Further details of the construction of the pistons and also of their packing will be described later, the arrangement by which the motions of the pistons are controlled so as to be variable relatively to each other and by which motion is transmitted therefrom to the main shaft of the engine, being first described.

It has already been stated that each piston shaft carries at its outer end a double throw crank 34. In like manner the main shaft of the engine carries at each end a double throw crank 62, at each side of the cylinder. The outer arms 63, 64, of said cranks, 34, 62, respectively are connected by a connecting rod 65, (Figs. 1, 2,) their inner arms, 66, 67, respectively are connected by a yoke 68 in which slides a slide block 69, into which passes the end of a pin 70, secured in the center of the connecting rod 65. On account of the distance between the ends of the inner cranks being not always the same as the distance between the ends of the outer cranks, it is necessary that one end of the yoke 68 should have a sliding block connection, as shown at 72, with its crank. As the piston and the main shaft turn so as to carry the outer arm of the cranks through half a revolution, the slide block 69 by its engagement with the pin 70 carried by the connecting rod, is caused to make one-half of a complete reciprocation in the yoke 68.

The two cranks of each double crank are of the same length, so that the velocity of each end of the yoke is one-half that of the corresponding end of the connecting rod. The relative movements of the pistons 56, the connecting rod 65 and the yoke 68, will be more easily understood by references to the diagrams shown in Figs. 25 to 30. In these diagrams, one of the pistons, and the parts directly coöperating therewith, are shown in full lines, and the other piston and similar parts are shown in dotted lines. In the diagram shown in Fig. 25 the parts are in the position of the commencement of the cycle of movement of one of the pistons, that shown in full lines, that is, in the position in which the steam has just been admitted behind said piston to propel the same. In this position, the connecting rod 65 is substantially at right angles to the crank arm 34 of the piston shaft, whereas it makes an acute angle with the corresponding crank arm 62 of the main shaft. It will readily be seen that while said crank arm of the main shaft is moving through a half revolution from the position shown in Fig. 25 to that shown in Fig. 28, the crank arm of the leading piston shaft moves through an angle much greater than one-half of a revolution, this movement being about five-sevenths of a revolution. And it follows, and will readily be seen also from the diagrams, that while the crank arm of the main shaft is traveling through the other one-half of its revolution, from the position shown in Fig. 28 to that shown in Fig. 25, the crank arm of the piston shaft, moves through a much smaller angle, only about two-sevenths of a revolution. Thus the average velocity during the first part of the movement is about two and one-half times that of the latter part of the movement. Since the two piston shafts are connected by their corresponding connecting rods 65 to diametrically opposite crank arms 62 on the same main shaft, it follows, that while one of the piston shafts is making a rapid movement through five-sevenths of a revolution, the other piston shaft is making a slow movement through two-sevenths of a revolution, and it is by reason of the difference in these velocities that one of the pistons can be used as a piston proper to receive the pressure of the steam and transmit the force thereof in the form of motion to the main shaft, while at the same time the other piston, on account of its slow movement, is acting merely as a wall or abutment to resist the back pressure of the steam. From a comparison of these diagrams, it will be seen how the piston which is receiving steam behind it gains on the other during the first half of the rotation of the main shaft, and then during the next half of said rotation, the other piston having received steam behind it, gains on the first. Thus it is evident that if means are provided whereby the pistons are compelled to be alternately fast and slow in the movement of the manner above described, steam or other pressure fluid can be applied between the pistons to alternately propel the same.

So far as the relative fast and slow movements of the pistons are concerned, only the arrangement of the cranks and connecting rods described and illustrated in the above diagrams is necessary. Said pistons would move in this way without having to make the cranks double throw cranks or to use the yokes 68, but for the fact that, when said cranks arrive in the line of their centers, there would be no certainty that the driven crank would then continue onward in the same direction, but it might, instead, move in the reverse direction. It is for the purpose of insuring that the driven crank upon the main shaft proceeds onward in the same direction on arriving at this point, that the yokes 68, slide blocks 69 and pins 70 are provided. The necessity of said driven crank being compelled to move onward in the same direction by reason of these added elements will be apparent from the consideration of a contrary supposition.

Figure 27:
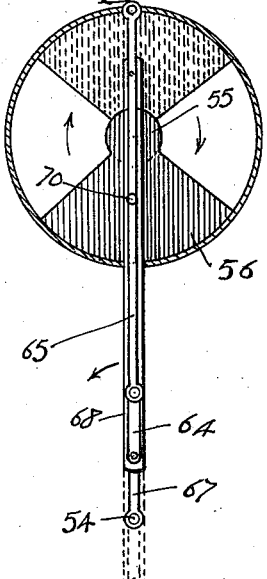
Figure 28:
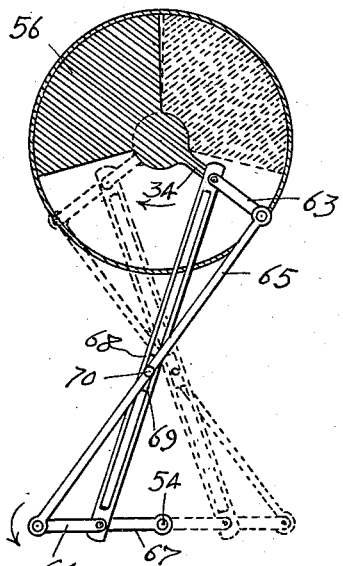
Figure 29:
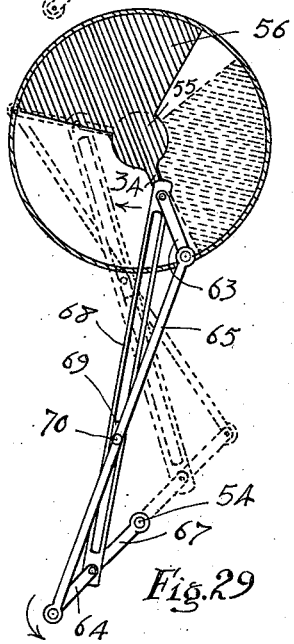
Figure 30:
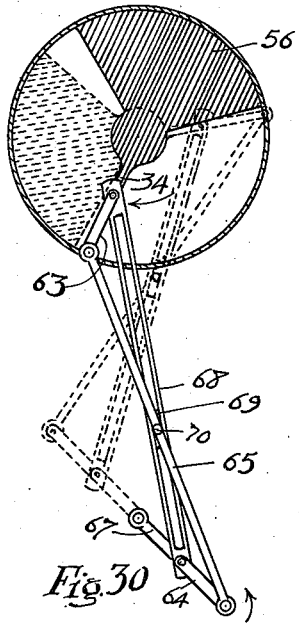

If the upper crank arrived at, and just passed, the position shown in Fig. 27, so that the upper end of the connecting rod 65 was slightly in advance, in the direction indicated by the arrow, of the vertical line through the centers, then the lower end of said connecting rod would also be slightly in advance, in the other direction, of the line through the centers, for, if it were possible for the crank of the main shaft on arriving at its highest point, to return on its former path in the reverse direction, that is, in the same directions as the upper end of the connecting rod 65, then, since the ends of the connecting rod would be both on the same side of said vertical line, and the ends of the yoke would also both be on that side of said line, and since the distance from said vertical line of each end of the connecting rod is always twice the distance from said line of the corresponding end of the yoke, and since the pin 70 is in line with the ends of the connecting rod 65, while the slide block 69 is in line with the ends of the yoke 68, it would result that the pin 70 would be twice as far from the vertical line as the slide block 69, which is impossible, since the pin passes through the slide block. It follows, therefore, that by connecting the center of the connecting rod 65 with the yoke so that it is always in the line between the ends of said yoke, it is rendered impossible for the crank on the driven shaft to turn back on arriving at the vertical line of the crank centers.

An important advantage of this construction is that the above described parts are connected in such a manner as to reduce the friction to a minimum. The only sliding friction is that of the sliding block 69, and it is to be observed that the pressure, and therefore the friction, on this sliding block is the greatest when it is substantially at rest, which is when the cranks are passing through the vertical line of the centers.

It being understood how each piston passes in succession the steam ports on one side of the cylinder and the exhaust ports on the other, a further explanation of the arrangement of the valves controlling said ports is now necessary. In addition to the cut-off valve 30 which can be moved to close a greater or less number of the steam ports, there is provided at the top of each side of the cylinder a compression valve 74, (Figs. 1, 3,) the function of which is to regulate the amount of steam inclosed between the two pistons and compressed by them to form a cushion as they come together at the end of the stroke. Each of the cut off and compression valves is held close against the side of the cylinder, although this is only needed on the exhaust side, by means of a wall 75 extending inward from the cover plate of the steam chamber, and on each valve is formed a circular rack 76 which is engaged by a pinion 77 on a shaft 78 extending outside the steam chamber and carrying on its outer end a pinion 79 which is moved by a rack 80. By suitable movements of said racks the valves are moved to a greater or less extent over the ports, the cut-off valve over the steam ports to regulate the interval after admission of the steam at which the steam is cut off by the following piston, and the compression valve over the exhaust ports to regulate the point at which the exhaust is cut off by the advancing piston, which is at that time gaining on the other piston, and thereby to regulate the amount of steam that is compressed between the two pistons to form a cushion.

While in the present instance the cut-off valve on one side of the cylinder and the compression valve on the other side are shown as independently operated, it is evident that the means for operating these two valves can be connected so as to act in unison. The compression valve on the steam side of the cylinder and the cut-off valve on the exhaust side are opened to the full extent.

I will now describe my arrangement of packing to prevent leakage of steam.

Each of the hubs is provided at its side next to the wall of the cylinder with a packing ring 81, (Figs. 7, 8, 10–18), the outer surface of which is smooth where it revolves against the interior wall of the cylinder, while the inner surface is serrated, being formed with teeth 82 and notches therebetween, which fit respectively into corresponding notches and teeth 83 formed upon the outer edge of the hub proper. Between said packing ring and the hub proper are interposed a suitable number of coiled springs 84 which normally press the packing ring against the wall of the cylinder. Thereby steam is prevented passing down between the side of the hub and the wall of the cylinder to the shaft, and so escaping along said shaft. The teeth and notches permit of this expansive movement due to said springs, and still prevent steam escaping between the surface of the hub, and the inner surface of the piston overlying said hub. The spaces between the ends of the teeth and the bottom of the notches are closed on the inside by a snap ring 85, which is of sufficient width, (Figs. 7, 10, 11) to entirely cover the inner ends of the teeth and notches, so that steam cannot escape by passing inward through the space at the end of a tooth, then flowing circumferentially in the interior of the serrated ring, and then out at the end of another tooth. A similar packing ring is interposed between the two hubs, so that one of the hubs 55′ has teeth 83 and serrated packing rings 81 on both sides, and the other hub 55, only on one side.

Inasmuch as the above part of the packing of the engine is not peculiarly adapted for the present form of engine, but is equally adaptable to most, if not all, forms of rotary engines, and is an important improvement in rotary engine packing, I do not claim the same herein, but claim it in a separate application.

Each piston is packed at each end to prevent the leakage of steam circumferentially by means of a semi-circular spring packing strip 88 (Figs. 5, 8, 9) received in a groove 87 in the end plate 61 adjacent to said end. The inner or central portion of said spring ring is pressed out against the wall of the cylinder by means of springs 89 in sockets in the piston (Fig. 8). Each end of said strip 88 is formed with a rabbeted end 90, one of said ends engaging the similar end of a straight packing piece 91, which is received in a continuation of said groove 87 and extends into a longitudinal groove 92 formed in its own hub, and also the groove 92′ in the adjacent packing ring 81, (Figs. 5, 9, 12, 13). A spring 93 (Fig. 8) is provided in an oblique socket in said packing piece, which presses said packing piece both against the bottom of the groove 92 in the hub and against the wall of the cylinder. A packing piece 94 on the other side of the cylinder is connected with the spring ring 88 by a like joint 95, and at its inner end rides upon the hub of the other piston, being pressed thereon and also against the wall of the cylinder by means of a spring 96 in an oblique socket in said packing piece.

Between the inner ends of the packing pieces 91, 94, are the three packing pieces 97, 98, 99. The piece 97 has rabbeted ends one engaging a similar end on the piece 94 and the other engaging a similar end on the piece 98. The packing piece 98 is formed with a lug 101 which rests in the groove 92 of the hub of its own piston and is adapted to press against the edge of the other hub, (Fig. 16). The packing piece 99 is also received in said groove 92 and is recessed to receive a spring 100, which is compressed between said piece 99 and the piece 91, and thus normally presses the lug 101 against the other hub, and a spring 104 also presses the packing piece 99 down in the groove 92″ of the hub 55′ which has two packing rings 81. Over the opening of the joint between the two packing strips 97, 98, is a block 105 which is pressed down by means of a spring 106 and has a socket 103 to receive a pin 107 extending from the packing strip 97 so that said spring 106 not only presses the packing strip 97 down upon the hub, but also against the inner side of the packing piece 94. An additional spring 102 is provided for the block 105 in the piston of the hub 55′ having two packing rings 81. A spring 114 presses against the block 98 of the other hub.

Each side of each piston is formed with inner and outer circular concentric grooves 108 in which are placed correspondingly formed packing strips 109 which are pressed outward by means of springs 110. As shown in Fig. 7, these strips 109 are at such respective distances from the axis of the engine that they inclose between them either the steam or the exhaust ports. Between said curved strips are three radial strips 111 in corresponding grooves, which are also pressed outward by means of springs 112. The wedge-shaped parts of opposite walls of each piston which intervene between the last mentioned packing strips are connected by tubes 113, their function being to permit the steam supply at one side of the piston to pass to the corresponding spaces at the opposite side of the piston. But for these connections, since the steam is admitted against the piston at one side and is exhausted at the other, the effect would be to create a lateral or axial pressure upon the piston causing friction between the exhaust side of the piston and the adjacent wall of the cylinder. By permitting the steam from the steam ports, as the piston passes them, to pass through the piston to its opposite side, this pressure is balanced.

It will be observed that the present construction avoids nearly all loss due to initial condensation which occurs in all reciprocating engines and in some rotary engines. This initial condensation is caused by the cooling of the steam as it expands, which correspondingly cools the inner surface of the cylinder and by partial condensation reduces the efficiency of the live steam supplied to the cylinder.

With the present construction, although the steam cools by expansion, yet, while it is so cooling, the steam moves with and between the pistons around the cylinder, and the cooling action of the steam does not affect except by conduction the temperature of that part of the cylinder which is left behind by the steam as it travels, and which is covered by the following or, at that time, slowly moving piston. The part of the cylinder next the steam inlet is the hottest, and the temperature of the interior of the cylinder falls gradually from said inlet around the cylinder, but any given point of said interior remains at substantially the same temperature, approximating that to which the steam has by expansion fallen on passing said point. But the reduction in temperature of any point of the interior of the cylinder due to the lower temperature of the steam at a point in advance is caused only by conduction through the metal and not by the direct action of the cooled steam, from which said point is protected by the following, or slowly moving, piston.

The engine can be reversed merely by turning the reversing valve from one position to another.

An important advantage of the arrangement for transmitting power from the engine shafts to the main shaft is that the injurious effect of lost motion due to wear and looseness of the joints is thereby reduced to a minimum. This is due to the link 65 being substantially at right angles to the crank 63 when the piston receives its initial impulse from the steam. It will also be observed that on account of the bearings 39, 40, and 44, being in separate pieces from the casing of the cylinder, said bearings are not liable to become so highly heated as when the bearings are in the casing itself.

I claim:—

1. In a rotary engine, the combination of a cylinder, a shaft rotating in the cylinder, a piston secured to said shaft, the walls of the cylinder transverse to the shaft being apertured from a circular series of ports, a casing forming with each of said apertured walls, a chamber, a valve in the form of a circular arc movable over each series of ports, and means for selectively admitting steam to the chamber at one side and exhausting it from the chamber at the other, substantially as described.

2. In a rotary engine, the combination of a cylinder, a shaft rotating in the cylinder, a piston secured to said shaft, the walls of the cylinder transverse to the shaft being apertured to form ports, a casing forming with each of said apertured walls a chamber, valves for controlling said ports, and means for selectively admitting steam to the chamber at one side and exhausting it from the chamber at the other, substantially as described.

3. In a rotary engine, the combination of a cylinder, a shaft rotating in said cylinder, a piston rotating in said cylinder on said shaft, a casing at each side of the cylinder, forming a chamber, the walls of the cylinder between said cylinder and chambers being formed with ports, and a cut off valve and a compression valve arranged to be moved over the ports at the opposite sides of the cylinder, respectively, substantially as described.

4. In a rotary engine, the combination of a cylinder, a shaft therein, a piston on said shaft rotating in said cylinder, casing forming chambers, one on each side of the cylinder, a cut off valve and a compression valve in the chambers, at both sides of the cylinder, and means for moving said valves, substantially as described.

5. In a rotary engine, the combination of a cylinder, a shaft therein, a piston on said shaft rotating in said cylinder, the sides of the cylinder having ports, a cut off valve and a compression valve on each side, movable over said ports, and casings for forming chambers over said ports, said casings comprising parts arranged to rest against the compression valves and hold them to their seats, substantially as described.

6. In a rotary engine, the combination of cylinder sections secured together on a plane transverse to the axis of the cylinder, the cylinder thus formed being flat at the center and semi-circular at its periphery in cross section, each side of the cylinder having ports adapted to be used interchangeably for steam or exhaust ports, casings at the sides of the cylinder forming steam and exhaust chambers, a steam chest, the engine being provided with passages leading from said chest to said steam and exhaust chambers, and means for selectively connecting said chest with said passages, substantially as described.

7. In a rotary engine, the combination of cylinder sections secured together on a plane transverse to the axis of the cylinder, the cylinder thus formed being flat at the center and semi-circular at its periphery in cross section, each side of the cylinder having ports arranged in circular series, adapted to be used interchangeably for steam or exhaust ports, a valve in the form of a circular arc movable over each series of ports, casings at the sides of the cylinder forming steam and exhaust chambers, a steam chest, the engine being provided with passages leading from said chest to said steam and exhaust chambers, and means for selectively connecting said chest with said passages, substantially as described.

8. In a rotary engine, the combination of a cylinder, shafts rotating therein, arranged axially of the cylinder, pistons secured to said shafts, and rotating in the cylinder, a driven shaft, two cranks on the latter shaft, a crank on each of the former shafts, connections between the latter cranks and the respective cranks on the driven shaft, and means for insuring onward movement with each other of the cranks on the driven and driving shafts on passing the line of centers, substantially as described.

9. In a rotary engine, the combination of a cylinder, shafts arranged axially therein, pistons on the respective shafts, double cranks on the respective shafts, a driven shaft, double cranks on the latter shaft, links connecting the outer end of each crank on the driven shaft with the outer end of the corresponding crank on a cylinder shaft, and yokes connecting an intermediate part of each crank on the driven shaft with an intermediate part of the cranks on the cylinder shafts, each link and the corresponding yoke being provided with means for maintaining a part of one always in contact with a part of the other, substantially as described.

10. In a rotary engine, the combination of a cylinder, shafts arranged axially therein, pistons on the respective shafts, double cranks on the respective shafts, a driven shaft, double cranks on the latter shaft, links connecting the outer end of each crank on the driven shaft with the outer end of the corresponding crank on a cylinder shaft, and yokes connecting an intermediate part of each crank on the driven shaft with an intermediate part of the cranks on the cylinder shafts, each link having a block, and the corresponding yoke having a slide way in which said block can slide, substantially as described.

11. In a rotary engine, a piston formed of a sector of a hollow annulus having its periphery rounded in cross section, a plate closing an end of the piston, and forming therewith a transverse peripheral groove, and packing pieces in said groove, substantially as described.

12. In a rotary engine, a piston formed of a sector of a hollow annulus, a plate closing an end of the piston, forming therewith a transverse peripheral groove, and packing pieces in said groove, substantially as described.

13. In a rotary engine, in combination with a hub having a longitudinal groove, a piston thereon, a side radial packing piece for said piston, and a packing piece in the groove, said packing pieces having rabbeted ends engaging each other, substantially as described.

14. In a rotary engine, a hub, a piston secured thereto, a curved packing piece around the outer periphery of the piston, side packing pieces having rabbeted ends engaging the ends of the curved packing piece, and an inner packing piece between the piston and hub having a rabbeted end engaging the end of a side packing piece, and means for pressing all of said packing pieces outward, substantially as described.

15. In a rotary engine, a hub, a piston secured thereto, a curved packing piece around the outer periphery of the piston, side packing pieces having rabbeted ends engaging the ends of the curved packing piece, and inner packing pieces between the piston and hub, one of said pieces having a rabbeted end engaging the end of the side packing piece, a packing piece covering the juncture of said inner packing pieces, and means for pressing all of said packing pieces outward, substantially as described.

16. In a rotary engine, in combination with a hub, and a piston secured thereto, the hub having a groove underneath the piston, and the piston being rounded on its outer periphery packing pieces inserted in the periphery and groove and forming a continuous series, the ends of the packing pieces engaging each other to prevent passage of steam therebetween, and means for pressing outward all of said packing pieces, substantially as described.

17. In a rotary engine, in combination with a cylinder having steam and exhaust ports through the same side wall thereof, a piston rotatable in said cylinder having packing pieces on the side next the ports, inner and outer packing pieces at such respective distances from the axis of the engine as to inclose between them said ports, and means for pressing said packing pieces against said wall, substantially as described.

18. In a rotary engine, the combination of a cylinder having a steam port at one side, a piston rotating therein, and conduits leading through said piston to the opposite side to pass steam therethrough to balance the pressure upon the piston of the steam admitted through the port, substantially as described.

19. In a rotary engine, the combination of a cylinder having a steam port on one side and a piston rotating therein, packing pieces dividing the sides of the piston next the port into pressure-areas, means for dividing the opposite side of the piston into corresponding areas, and individual means for conducting steam from the port side to said pressure areas on the opposite side, substantially as described.

20. In a rotary engine, in combination with a hub having a longitudinal groove, a piston thereon, a side radial packing piece for said piston, and a packing piece in the groove, said packing pieces having rabbeted ends engaging each other, substantially as described.

21. In a rotary engine, a hub, a piston carried thereby, and a packing ring for said hub, the hub and the packing ring having teeth and intervening notches respectively co-engaging with each other whereby when the ring is pressed from the hub it prevents the escape of steam, substantially as described.

22. In a rotary engine, two hubs, pistons respectively carried thereby, and a notched ring between the two hubs, one of the hubs having, on the side next said ring, notches alternating with the notches in the ring, whereby the ring may be pressed against the other hub to prevent the escape of steam therebetween, substantially as described.

23. In a rotary engine, two hubs, pistons carried thereby, a notched ring between the hubs, one of said hubs being also notched on the side next the ring, the notches and teeth therebetween engaging each other, and outer notched rings, the other sides of the hubs being also notched for engagement with said notched rings, substantially as described.

24. In a rotary engine, two hubs, pistons carried thereby, a ring between the hubs, the side of the ring next one of said hubs being smooth, and the other side of the ring and side of the hub adjacent thereto being provided with means for permitting the ring to move outward from said hub while preventing movement of the ring angularly with reference to the hub and being also provided with means for preventing the steam passing circumferentially forward or backward over the juncture between the ring and hub, substantially as described.

25. In a rotary engine, a hub, a piston carried thereby, a ring at the side of the hub, the side of the ring opposite to the hub being smooth, and the other side of the ring and the side of the hub adjacent thereto being provided with means for permitting the ring to move outward from said hub while preventing movement of the ring angularly with reference to the hub and being also provided with means for preventing the steam passing circumferentially forward or backward over the juncture between the ring and hub, and coiled springs pressing outward between the hub and ring, substantially as described.

26. In a rotary engine, two hubs, pistons carried thereby, a ring between the hubs, the side of the ring next one of the hubs being smooth, and the other side of the ring and the side of the hub adjacent thereto being provided with means for permitting the ring to move outward from said hub while preventing movement of the ring angularly with reference to the hub and being also provided with means for preventing steam passing circumferentially forward or backward over the juncture between the ring and hub, and a snap ring covering the inner ends of all the spaces between the hub and ring, substantially as described.

27. In a rotary engine, two hubs, pistons carried thereby, a ring between the hubs, the side of the ring next one of said hubs being smooth, and the other side of the ring and the side of the hub adjacent thereto being provided with means for permitting the ring to move outward from said hub while preventing movement of the ring angularly with reference to the hub and being also provided with means for preventing the steam passing circumferentially forward or backward over the juncture between the ring and hub, and packing pieces over the spaces between the hub and ring, substantially as described.

28. In a rotary engine, a hub, a piston carried thereby, a ring at the side of the hub, the side of the ring opposite to the hub being smooth, and the other side of the ring and the side of the hub adjacent thereto being provided with means for permitting the ring to move outward from said hub while preventing movement of the ring angularly with reference to the hub and being also provided with means for preventing the steam passing circumferentially forward or backward over the juncture between the ring and hub, substantially as described.

29. In a rotary engine, a hub, a piston carried thereby, a ring at the side of the hub, the side of the ring opposite to the hub being smooth, and the other side of the ring and the side of the hub adjacent thereto being provided with means for permitting the ring to move outward from said hub while preventing movement of the ring angularly with reference to the hub and being also provided with means for preventing the steam passing circumferentially forward or backward over the juncture between the ring and hub, and coiled springs pressing outward between the hub and ring, substantially as described.

30. In a rotary engine, a hub, a piston carried thereby, a ring at the side of the hub, the side of the ring opposite to the hub being smooth, and the other side of the ring and the side of the hub adjacent thereto being provided with means for permitting the ring to move outward from said hub while preventing movement of the ring angularly with reference to the hub and being also provided with means for preventing the steam passing circumferentially forward or backward over the juncture between the ring and hub, and a snap ring covering the inner ends of all the spaces between the hub and ring, substantially as described.

31. In a rotary engine, a hub, a piston carried thereby, a ring at the side of the hub, the side of the ring opposite to the hub being smooth, and the other side of the ring and the side of the hub adjacent thereto being provided with means for permitting the ring to move outward from said hub while preventing movement of the ring angularly with reference to the hub and being also provided with means for preventing the steam passing circumferentially forward or backward over the juncture between the ring and hub, and packing pieces over the spaces between the hub and ring, substantially as described.

32. In a rotary engine, a hub, a piston secured thereto, a curved packing piece around the outer periphery of the piston, side packing pieces having rabbeted ends engaging the ends of the curved packing piece, and an inner packing piece between the piston and hub having a rabbeted end engaging the end of a side packing piece, and means for pressing all of said packing pieces outward, substantially as described.

33. In a rotary engine, a hub, a piston secured thereto, a curved packing piece around the outer periphery of the piston, side packing pieces having rabbeted ends engaging the ends of the curved packing piece, and inner packing pieces between the piston and hub, one of said pieces having a rabbeted end engaging the end of the side packing piece, a packing piece covering the juncture of said inner packing pieces, and means for pressing all of said packing pieces outward, substantially as described.

34. In a rotary engine, in combination with a hub, and a piston secured thereto, the hub having a groove underneath the piston, and the piston being rounded on its outer periphery, packing pieces inserted in the periphery and groove and forming a continuous series, the ends of the packing pieces engaging each other to prevent passage of steam therebetween, and means for pressing outward all of said packing pieces, substantially as described.

35. In a rotary engine, a cylinder having steam ports at one side of the piston, a piston secured thereon, two groups of packing pieces secured upon the piston, each group forming a continuous series around the piston, and packing members at the sides of the piston, next the steam ports and between the two groups, substantially as described.

36. In a rotary engine, in combination with a cylinder having steam and exhaust ports at one side and a radial division between said ports, a piston rotating within said cylinder having packing pieces on the side next the ports and a packing member between said packing pieces, and means for pressing said packing member against said ports, substantially as described.

37. In a rotary engine, in combination with a cylinder having steam and exhaust ports at one side and a radial division between said ports, a piston rotating within said cylinder having packing pieces on the side next the ports and a packing member between said packing pieces, concentric curved packing members at such distance from the axis of the engine as to inclose between them said ports, and means for pressing said packing member against said ports, substantially as described.

38. In a rotary engine, a hub, a piston secured thereto, a curved packing piece around the outer periphery of the piston, side packing pieces having rabbeted ends engaging the ends of the curved packing piece, and an inner packing piece, between the piston and hub, having a rabbeted end engaging the end of a side packing piece, and means for pressing all of said packing pieces outward, substantially as described.

39. In a rotary engine, a hub, a piston secured thereto, a curved packing piece around the outer periphery of the piston, side packing pieces having rabbeted ends engaging the ends of the curved packing piece, and inner packing pieces between the piston and hub, one of said pieces having a rabbeted end engaging the end of the side packing piece, a packing piece covering the juncture of said inner packing pieces, and means for pressing all of said packing pieces outward, substantially as described.

40. In a rotary engine, in combination with a hub, and a piston secured thereto, the hub having a groove underneath the piston, and the piston being rounded on its outer periphery, packing pieces inserted in the periphery and groove and forming a continuous series, the ends of the packing pieces engaging each other to prevent passage of steam therebetween, and means for pressing outward all of said packing pieces, substantially as described.

41. In a rotary engine, in combination with a cylinder having steam and exhaust ports through the same side wall thereof, a piston rotatable in said cylinder having packing pieces on the side next the ports, inner and outer packing pieces at such respective distance from the axis of the engine as to inclose between them said ports, and means for pressing said packing pieces against said wall, substantially as described.

42. In a rotary engine, the combination of a cylinder having a steam port on one side and a piston rotating therein, packing pieces dividing the sides of the piston next the port into pressure-areas, means for dividing the opposite side of the piston into corresponding areas, and individual means for conducting steam from the port side of said pressure areas on the opposite side, substantially as described.

43. A rotary engine, comprising a casing, a runner therein formed on its periphery at each side thereof with teeth and notches therebetween, a part interposed between said runner and the side of the casing and formed with notches and teeth co-engaging the teeth and notches of the runner, and means for pressing said part radially outward against the side of the groove to cover the space between said teeth and notches substantially as described.

In testimony whereof I have hereunto set my hand in the presence of two subscribing witnesses.

JOHN T. AABEL.

Witnesses:
 FRANCIS M. WRIGHT,
 D. B. RICHARDS.

Copies of this patent may be obtained for five cents each, by addressing the "Commissioner of Patents, Washington, D. C."